United States Patent
Kim et al.

(10) Patent No.: US 7,133,609 B2
(45) Date of Patent: Nov. 7, 2006

(54) BIDIRECTIONAL WDM SELF-HEALING RING NETWORK

(75) Inventors: Jong-Kwon Kim, Taejonkwangyok-shi (KR); Sang-Hyun Doh, Kyonggi-do (KR); Yun-Je Oh, Yongin-shi (KR); Ki-Cheol Lee, Suwon-shi (KR); Jong-Hun Lee, Suwon-shi (KR); Hak-Phil Lee, Inchonkwangyok-shi (KR); Se-Kang Park, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 659 days.

(21) Appl. No.: 10/446,523

(22) Filed: May 28, 2003

(65) Prior Publication Data

US 2004/0131354 A1 Jul. 8, 2004

(30) Foreign Application Priority Data

Jan. 3, 2003 (KR) .................... 10-2003-0000357

(51) Int. Cl.
*H04B 10/00* (2006.01)
(52) U.S. Cl. .............................. 398/3; 398/59; 398/83
(58) Field of Classification Search ................ 398/1–5, 398/17–19, 34, 45, 59, 83; 370/228
See application file for complete search history.

(56) References Cited

U.S. PATENT DOCUMENTS

| | | | |
|---|---|---|---|
| 6,542,660 B1 * | 4/2003 | Medin et al. ................. 385/24 |
| 6,577,652 B1 * | 6/2003 | Kamata ...................... 370/535 |
| 6,839,514 B1 * | 1/2005 | Sharma et al. ................. 398/2 |
| 6,853,811 B1 * | 2/2005 | Wahler et al. ................. 398/7 |
| 2002/0126334 A1 * | 9/2002 | Milton et al. ............... 359/110 |

* cited by examiner

*Primary Examiner*—Dzung Tran
(74) *Attorney, Agent, or Firm*—Cha & Reiter, L.L.C.

(57) ABSTRACT

A bidirectional WDM self-healing ring network is provided and includes an outer ring network and an inner network for processing N units of optical signals and for performing a protection switching by using the outer ring network when the inner ring network suffers a link failure.

10 Claims, 9 Drawing Sheets

BIDIRECTIONAL WDM SELF-HEALING RING NETWORK

CLAIM OF PRIORITY

This application claims priority to an application entitled "Bidirectional WDM self-healing ring network," filed in the Korean Intellectual Property Office on Jan. 3, 2003 and assigned Serial No. 2003-357, the contents of which are hereby incorporated by reference.

BACKGROUND OF THE INVENTION

1. Field of the Invention

The present invention relates to an optical network, more particularly to an optical network employing a WDM (wavelength-division-multiplexing) technique.

2. Description of the Related Art

As a WDM technique enables the transmission of a plurality of optical signals through a single strand of an optical fiber, it has become possible to transmit a plurality of very high-speed mass-storage optical signals. With the aid of a switch that add/drop the optical signal in the optical layer, it is possible to build an optical network based on the WDM technique.

A WDM optical network is generally classified into a ring network using an optical add/drop multiplexer and a mesh network using an optical cross-connect. The WDM optical network transmits very high-speed mass-storage data through each optical fiber, thus requiring the WDM optical network to effectively cope with any undesirable failures in the system. In case of the mesh network, nodes of each optical network are connected to each other through a plurality of optical fibers, so that a protection switching is carried out through a complicated procedure at a low-speed when the system fails. However, in case of the ring network, only two or four strands of optical fibers are connected to the optical add/drop multiplexer, thereby enabling easier switching when the system fails. For this reason, the ring network is widely used in the market.

A node of a WDM ring network includes an optical add/drop multiplexer having a switching unit for adding/dropping an optical signal and a switching device for performing a protection switching of the network. The WDM ring network is divided into a path protection switching network and a link protection switching network depending on the protection switching manner. The WDM ring network uses two or four strands of optical fibers. In addition, the WDM ring networks are classified into a unidirectional network and a bidirectional network depending on the transmission direction of data. Particularly, a conventional WDM ring network including two strands of optical fibers and bidirectionally transmitting the optical signal uses a link protection switching method utilizing a loop-back of the optical signals.

FIGS. 1A and 1B are respectively illustrates a construction and a protection switching according to a conventional bidirectional optical network using a link protection switching. As shown in FIG. 1A, each node of a ring network includes optical add/drop multiplexers 10a to 40a and 10b to 40b for adding/dropping optical signals through inner and outer rings 2 and 4, and 2×2 switching devices 110 to 180 for executing a switching for the protection purposes. The outer ring 4 transmits optical signals having wavelengths of $\lambda_1, \lambda_2, \lambda_3, \ldots \lambda_N$, and the inner ring 2 transmits optical signals having wavelengths of $\lambda_{N+1}, \lambda_{N+2}, \lambda_{N+3}, \ldots \lambda_{2N}$. The outer ring 4 transmits the optical signals clockwise and the inner ring 2 transmits the optical signals counterclockwise.

When an error occurs in an optical fiber link, the optical network transmits an optical signal to an opposite direction by looping-back the optical signal through two 2×2 switching devices, which are positioned at the both ends of the link with the error. For example, referring to FIG. 1B, if an error occurs in an optical link connecting an optical add/drop multiplexer 10a to an optical add/drop multiplexer 20a, the optical signals having wavelengths of $\lambda_1, \lambda_2, \lambda_3, \ldots \lambda_N$ intended to be transmitted to the optical add/drop multiplexer 20a from the optical add/drop multiplexer 10a are looped back to an optical add/drop multiplexer 10b through a switching device 120 and transmitted counterclockwise through the inner ring 2. The optical signals having wavelengths of $\lambda_1, \lambda_2, \lambda_3, \ldots \lambda_N$ transmitted through the inner ring 2 are transferred to the optical add/drop multiplexer 20a from an optical add/drop multiplexer 20b through a switching device 130, thereby completing the switching.

During the normal operation mode of the ring network, 2×2 switching devices 110 to 180 are maintained in a bar state, so that a signal applied to an input part $i_1$ is transferred to an output part $o_1$, and a signal applied to an input part $i_2$ is transferred to an output part $o_2$. However, if an error occurs in the ring network, 2×2 switching devices 110 to 180 maintain in a cross state, so that a signal applied to the input part $i_1$ is transferred to the output part $o_2$. As shown in FIG. 1B, when a switching device 130 is positioned in the cross state, in addition to the optical signals passing through the link with the error, the optical signals having wavelengths of $\lambda_{N+1}, \lambda_{N+2}, \lambda_{N+3}, \ldots \lambda_{2N}$, which are transmitted in a counterclockwise direction from the optical add/drop multiplexer 20b to the optical add/drop multiplexer 10b, are looped back so that the optical signals are transmitted in a clockwise direction through the outer ring 4. Then, the optical signals are transferred to the optical add/drop multiplexer 10b from the optical add/drop multiplexer 10a through the switching device 120. Switching devices that are remote from the link having the fault are still maintained in the bar state.

However, two drawbacks are created if a bidirectional self-healing ring network including two strands of optical fibers is established using the above-mentioned conventional technique. First, it is necessary to at least double the processing capacity of a multiplexer and a demultiplexer consisting the optical add/drop multiplexer for real application as the conventional technique requires to simultaneously multiplex and demultiplex the loop-back signals as well as the transmitted optical signals in order to perform the recovery process.

FIG. 2 shows a construction of a conventional optical cross-connect. On the assumption that upper optical add/drop multiplexers are operated as the nodes of the outer ring 4 and lower optical add/drop multiplexers are operated as nodes of the inner ring 2, the optical signals transmitted through the upper multiplexers have wavelengths of $\lambda_1, \lambda_2, \lambda_3, \ldots \lambda_N$, and the optical signals transmitted through the lower multiplexers have wavelengths of $\lambda_{N+1}, \lambda_{N+2}, \lambda_{N+3}, \ldots \lambda_{2N}$. However, multiplexing and demultiplexing operatons have to be carried out for an upper optical add/drop multiplexer 10a. That is, the capacity of a multiplexer 13 and a demultiplexer 12 has to be determined, by considering the loop-back of the transmitted optical signals in such a manner that the optical signals having wavelengths of $\lambda_{N+1}, \lambda_{N+2}, \lambda_{N+3}, \ldots \lambda_{2N}$ can pass through the upper optical add/drop multiplexer 10a. In the same way, the multiplexing and demultiplexing works have to be carried out for a lower optical add/drop multiplexer 10b to allow the optical signals having wavelengths of $\lambda_1, \lambda_2, \lambda_3, \ldots \lambda_N$ to pass through the upper optical add/drop multiplexer 10a. Accordingly, the capacity of the multiplexer and the demultiplexer of the optical add/drop multiplexer for transferring N signals is determined as 1×2N.

Another drawback is that the optical signal passing through a normal link is looped back together with the optical signal passing through the link where the error occurred. Referring back to FIG. 1, optical signals having wavelengths of $\lambda_{N+1}, \lambda_{N+2}, \lambda_{N+3}, \ldots \lambda_{2N}$ and passing through the normal link in the inner ring 2 are looped back, so they are transmitted in a clockwise direction of the outer ring 4. As a result, the transmitted optical signals are interrupted and suffers data loss.

Therefore, there is a need for an improved bidirectional WDM ring network that is cost effective to implement and requires less overload.

SUMMARY OF THE INVENTION

Accordingly, the present invention provides an effective and economical bidirectional WDM, self-healing ring network capable of reducing the capacity of the multiplexer and demultiplexer of an optical add/drop multiplexer and transmitting optical signals without looping back the optical signals when not warranted.

According to one aspect of the invention, in order to reduce the capacity of the multiplexer and the demultiplexer of an optical add/drop multiplexer by a half even if the optical signals are looped back for a recovery, a WDM filter is provided to the optical add/drop multiplexer, thus allowing the optical signals passing through the normal link without being looped back.

In one embodiment, a bidirectional WDM self-healing ring network is provided and includes an outer ring network and an inner network for processing N units of optical signals and performing a protection switching by using the outer ring network when the inner ring network has a fault or vice versa. The bidirectional WDM self-healing ring network includes: a node including; optical add/drop multiplexers positioned in the inner ring network and the outer ring network and having a demultiplexer and a multiplexer with a capacity of 1×N, respectively; a pair of switching devices extending through the outer ring network and the inner ring network and further positioned between the optical add/drop devices and an optical fiber link connected to other node; and, a plurality of WDM filters positioned at the both ends of the optical add/drop multiplexers and including a first port connected to the switching devices allowing all wavelength bands to pass therethrough; a second port only allowing optical signals having wavelength bands processed through one end of the ring networks to pass therethrough and connected to one end of the optical add/drop multiplexer provided in the ring network; and, a third port allowing optical signals having wavelength bands processed through the other ring network to pass therethrough and connected to the other end of the optical add/drop multiplexer, wherein, when the fault occurs in the optical fiber link, the WDM filters transfer the optical signals processed in the ring network including the WDM filters to one end of the optical add/drop multiplexer connected to the WDM filters, and transfer the optical signals processed in the other ring network excluding the WDM filters to a WDM filter connected to the other end of optical add/drop multiplexer, without passing the optical signals through the optical add/drop multiplexer connected to the WDM filters.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. For the purposes of clarity and simplicity, a detailed description of known functions and configurations incorporated herein will be omitted as it may make the subject matter of the present invention unclear.

Figure 1:
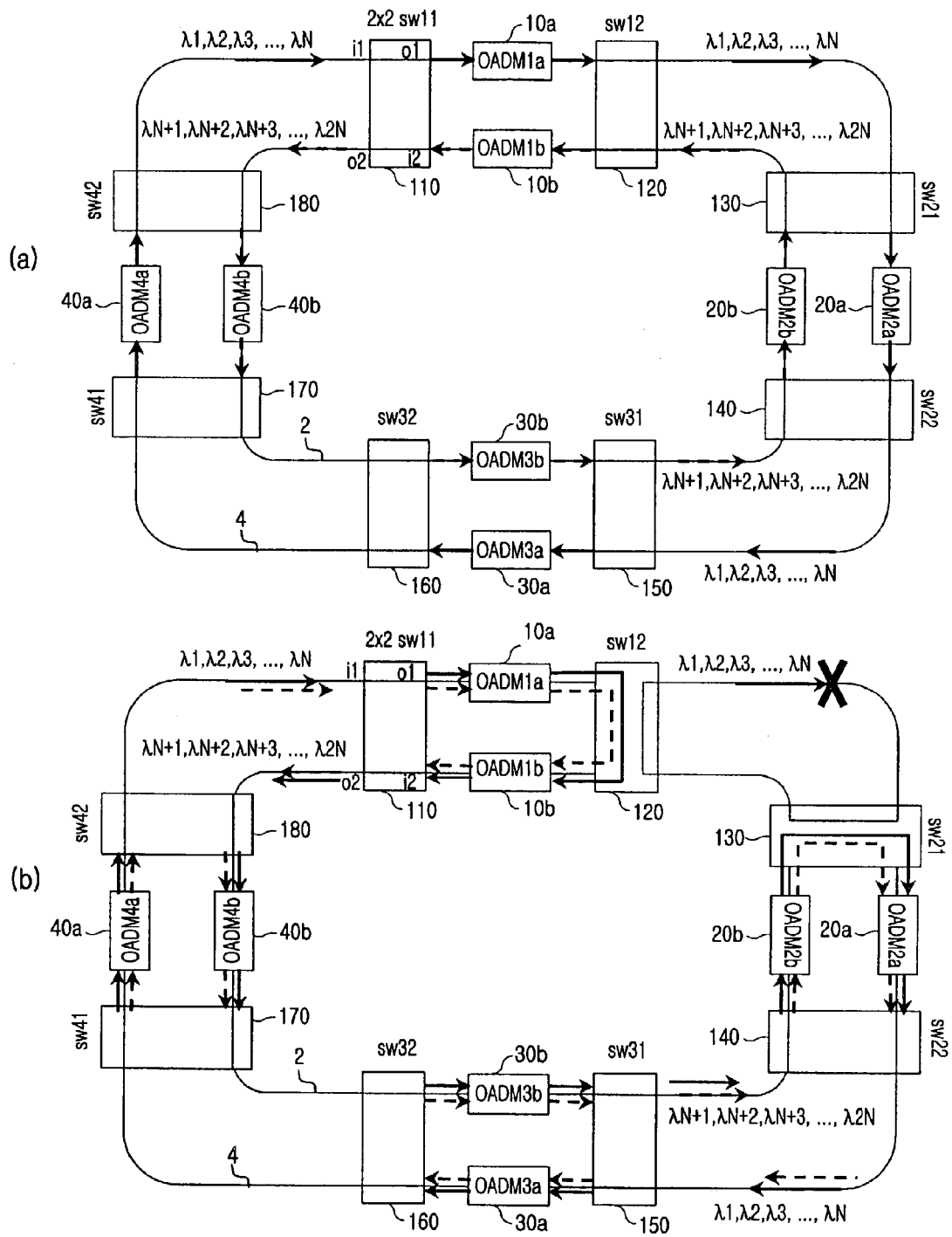
FIGS. 1A and 1B are views showing a construction and a protection switching manner of a conventional bidirectional optical network adopting a link protection switching method.
Figure 2:
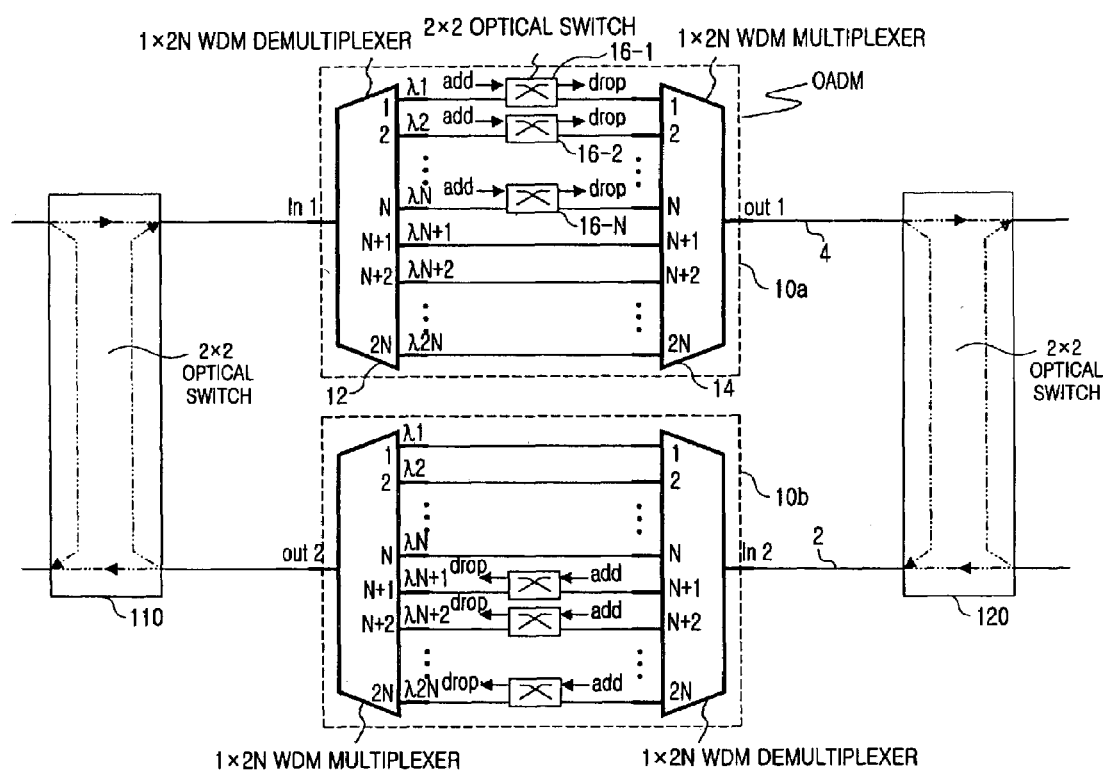
FIG. 2 is a view showing a construction of a conventional optical cross-connect.
Figure 3:
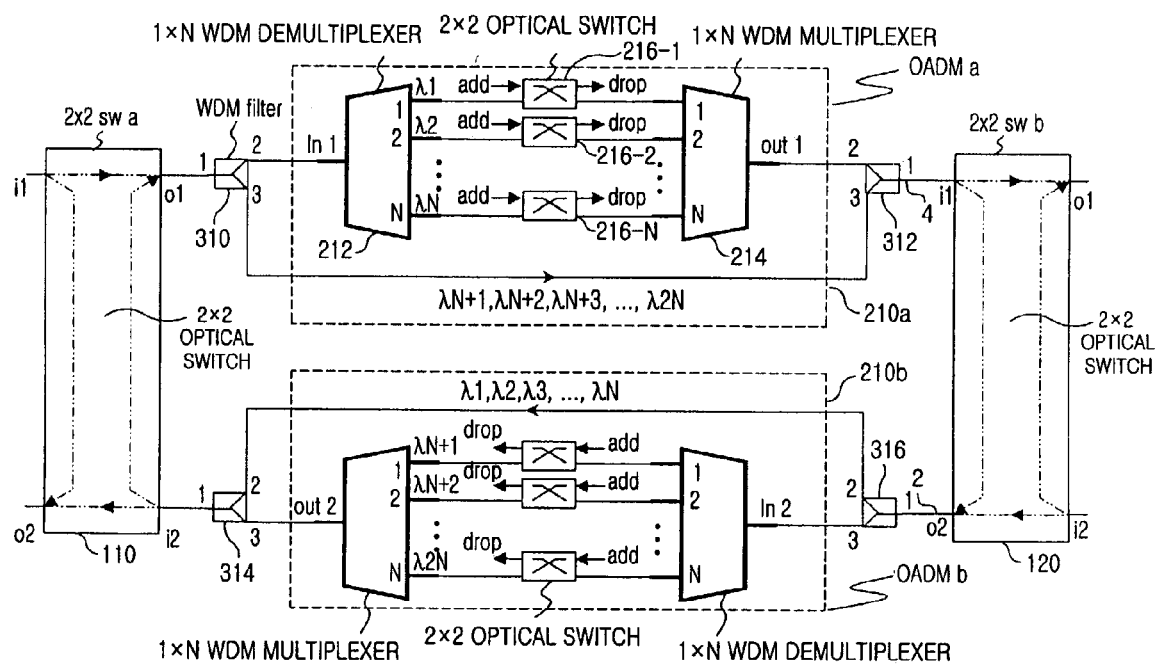
FIG. 3 is a view showing an optical add/drop multiplexer and a 2×2 optical switching device according to a first embodiment of the present invention.

FIG. 3 is a view showing an optical add/drop multiplexer and a 2×2 optical switching device according to a first embodiment of the present invention. FIGS. 4A and 4B are views showing a ring network using the optical add/drop multiplexer and the 2×2 optical switching device according to the first embodiment of the present invention shown in FIG. 3. In particular, FIG. 4A represents the ring network with a transmission link operating a normal mode, and FIG. 4B represents the ring network, in which an optical fiber transmission link connecting one optical add/drop multiplexer to another optical add/drop multiplexer has a failure.

Referring to FIGS. 3, 4A and 4B, each node of an outer ring network 4 and an inner ring network 2 includes optical add/drop multiplexers 210a and 210b for adding/dropping optical signals. 2×2 optical switching devices 110 and 120 are positioned at both sides of the optical add/drop multiplexers 210a and 210b while connecting the outer ring network 4 to the inner ring network 2. The outer ring network 4 provides a bypass circuit using a loop-back configuration when an optical fiber link of the inner ring network 2 has a failure. That is, the outer ring network 4 acts not only as a normal ring network, but also as a protection switching network for the inner ring network 2. In the same way, the inner ring network 2 acts not only as a normal ring network, but also as a protection switching network for the outer ring network 4. The outer ring network 4 transmits optical signals having wavelengths of $\lambda_1, \lambda_2, \lambda_3, \ldots \lambda_N$ and the inner ring network 2 transmits optical signals having wavelengths of $\lambda_{N+1}, \lambda_{N+2}, \lambda_{N+3}, \ldots \lambda_{2N}$. The outer ring network 4 transmits the optical signals clockwise and the inner ring network 2 transmits the optical signals counterclockwise.

Accordingly, the optical add/drop multiplexers 210a included in each node of the outer ring network 4 adds or drops the optical signals having wavelengths of $\lambda_1, \lambda_2, \lambda_3, \ldots \lambda_N$, clockwise. Similarly, the optical add/drop multiplexers 210b included in each node of the inner ring network 2 adds or drops the optical signals having wavelengths of $\lambda_{N+1}, \lambda_{N+2}, \lambda_{N+3}, \ldots \lambda_{2N}$, counterclockwise.

WDM filters 310, 312, 314, and 316 are connected to both ends of the optical add/drop multiplexers 210a and 210b. The WDM filters 310, 312, 314, and 316 multiplex or demultiplex signals having wavelength bands of $\lambda_1, \lambda_2, \lambda_3, \ldots \lambda_N$ and wavelength bands of $\lambda_{N+1}, \lambda_{N+2}, \lambda_{N+3}, \ldots \lambda_{2N}$. The WDM filters 310, 312, 314, and 316 have a first port allowing signals to pass therethrough regardless of the wavelength bands thereof, a second port allowing signals having wavelength bands of $\lambda_1, \lambda_2, \lambda_3, \ldots \lambda_N$ to pass therethrough, and a third port allowing signals having wavelength bands of $\lambda_{N+1}, \lambda_{N+2}, \lambda_{N+3}, \ldots \lambda_{2N}$ to pass therethrough.

At least one port of the WDM filters 310, 312, 314, and 316 is connected to the optical switching device 110 or 120, and at least one port of the WDM filters 310, 312, 314, and 316 is connected to another WDM filters 310, 312, 314, and 316 corresponding to the nodes of the ring network 2 or 4. In addition, at least one port of the WDM filters 310, 312, 314, and 316 is connected to the optical add/drop multiplexer 210a or 210b. For example, the first port of the WDM filter 310 connected to the optical switching device 110, the second port thereof is connected to one end of the optical add/drop multiplexer 210a, and the third port of the WDM filter 310 is connected to the other end of the optical add/drop multiplexer 210a. Each of the optical add/drop multiplexers 210a and 210b has a 1×N WDM demultiplexer 212, a 1×N WDM multiplexer 214, and N number of 2×2 optical switches 216-1, 216-2 . . . 216-N. According to the present invention, the capacity of the demultiplexer and multiplexer is set to 1×N, respectively, which is less than half of that of the conventional demultiplexer and multiplexer, which requires a capacity of (1×2N). This can be achieved by incorporating a plurality of WDM filters for channeling signals according to predetermined criteria (explained later) during a link failure.

When the bidirectional ring network of the present invention is normally operated without a link failure, optical signals having wavelengths of $\lambda_1, \lambda_2, \lambda_3, \ldots \lambda_N$ are inputted into the optical add/drop multiplexer 210a of the outer ring network 4, and optical signals having wavelengths of $\lambda_{N+1}, \lambda_{N+2}, \lambda_{N+3}, \ldots \lambda_{2N}$ are inputted into the optical add/drop multiplexer 210b of the inner ring network 2. The optical signals having wavelengths of $\lambda_1, \lambda_2, \lambda_3, \ldots \lambda_N$ inputted into the optical add/drop multiplexer 210a firstly pass through the optical switching device 110. Referring to FIG. 3, when the ring network is normally operated, the 2×2 optical switching device is maintained in a bar state, so the signals applied to a first input part $i_1$ are transferred to a first output part $o_1$, and the signals applied to a second input part $i_2$ are transferred to a second output part $o_2$. At this time, since the optical switching device 110 is also maintained in the bar state, the optical signals having wavelengths of $\lambda_1, \lambda_2, \lambda_3, \ldots \lambda_N$ applied to the first input part $i_1$ are transferred to the first output part $o_1$, and outputted through the WDM filter 310.

After the optical signals having wavelengths of $\lambda_1, \lambda_2, \lambda_3, \ldots \lambda_N$ have been inputted into the first port of the WDM filter 310 through the optical switching device 110, the optical signals are transferred to the optical add/drop multiplexer 210a by passing through the second port, which allows the optical signals having wavelengths of $\lambda_1, \lambda_2, \lambda_3, \ldots \lambda_N$ to pass therethrough. The optical add/drop multiplexer 210a only receives the optical signals having wavelengths of $\lambda_1, \lambda_2, \lambda_3, \ldots \lambda_N$ since an input terminal of the WDM filter 310 is connected to the second port. The optical signals outputted from the optical add/drop multiplexer 210a are inputted into the second port of the WDM filter 312 connected to an output terminal of the optical add/drop multiplexer 210a. The optical signals having wavelengths of $\lambda_1, \lambda_2, \lambda_3, \ldots \lambda_N$ inputted into the second port are transferred to the optical switching device 120 through the first port and forwarded to the adjacent optical switching device 130.

On the other hand, if the optical fiber link positioned between the optical switching device 120 and the optical switching device 130 of the outer ring network 4, the optical signals having wavelengths of $\lambda_1, \lambda_2, \lambda_3, \ldots \lambda_N$ inputted into the optical add/drop multiplexer 210a of the outer ring network 4 cannot be forwarded to the optical switching device 130 through the optical switching device 120. In this regard, the optical switching devices 120 and 130 positioned at both ends of the link are maintained in a cross state in response to a predetermined control signal. Since the optical switching device 120 is maintained in the cross state by the predetermined control signal, the optical signals transferred to the first input $i_1$ of the optical switching device 120 are outputted through the second output $o_2$ of the optical switching device 120 and looped back to the first port of the WDM filter 316 connected to the second output $o_2$ of the optical switching device 120.

The optical signals having wavelengths of $\lambda_1, \lambda_2, \lambda_3, \ldots \lambda_N$ inputted into the WDM filter 316 through the optical switching device 120 are transferred to the WDM filter 314 without passing through the optical add/drop multiplexer 210b via the second port of the WDM filter 316. Accordingly, the optical add/drop multiplexers of the present invention only multiplex or demultiplex optical signals, which are required to be added or dropped by the optical add/drop multiplexers. That is, the optical add/drop multiplexer 210b only processes the optical signals having wavelengths of $\lambda_{N+1}, \lambda_{N+2}, \lambda_{N+3}, \ldots \lambda_{2N}$. Hence, the optical signals having wavelengths of $\lambda_1, \lambda_2, \lambda_3, \ldots \lambda_N$ and inputted into the first port of the WDM filter 316 and transferred to the WDM filter 314 through the second port of the WDM filter 316, which only allows the optical signals having wavelengths of $\lambda_1, \lambda_2, \lambda_3, \ldots \lambda_N$ to pass therethrough. As such, the looped-back optical signals having wavelengths of $\lambda_1, \lambda_2, \lambda_3, \ldots \lambda_N$ are demultiplexed through the second port of the WDM filter 314 and multiplexed through the first port of the WDM filter 314, so that the optical signals having wavelengths of $\lambda_1, \lambda_2, \lambda_3, \ldots \lambda_N$ are transmitted into an adjacent node together with the optical signals having wavelengths of $\lambda_{N+1}, \lambda N+_2, \lambda N+_3, \ldots \lambda_{2N}$.

Figure 4:
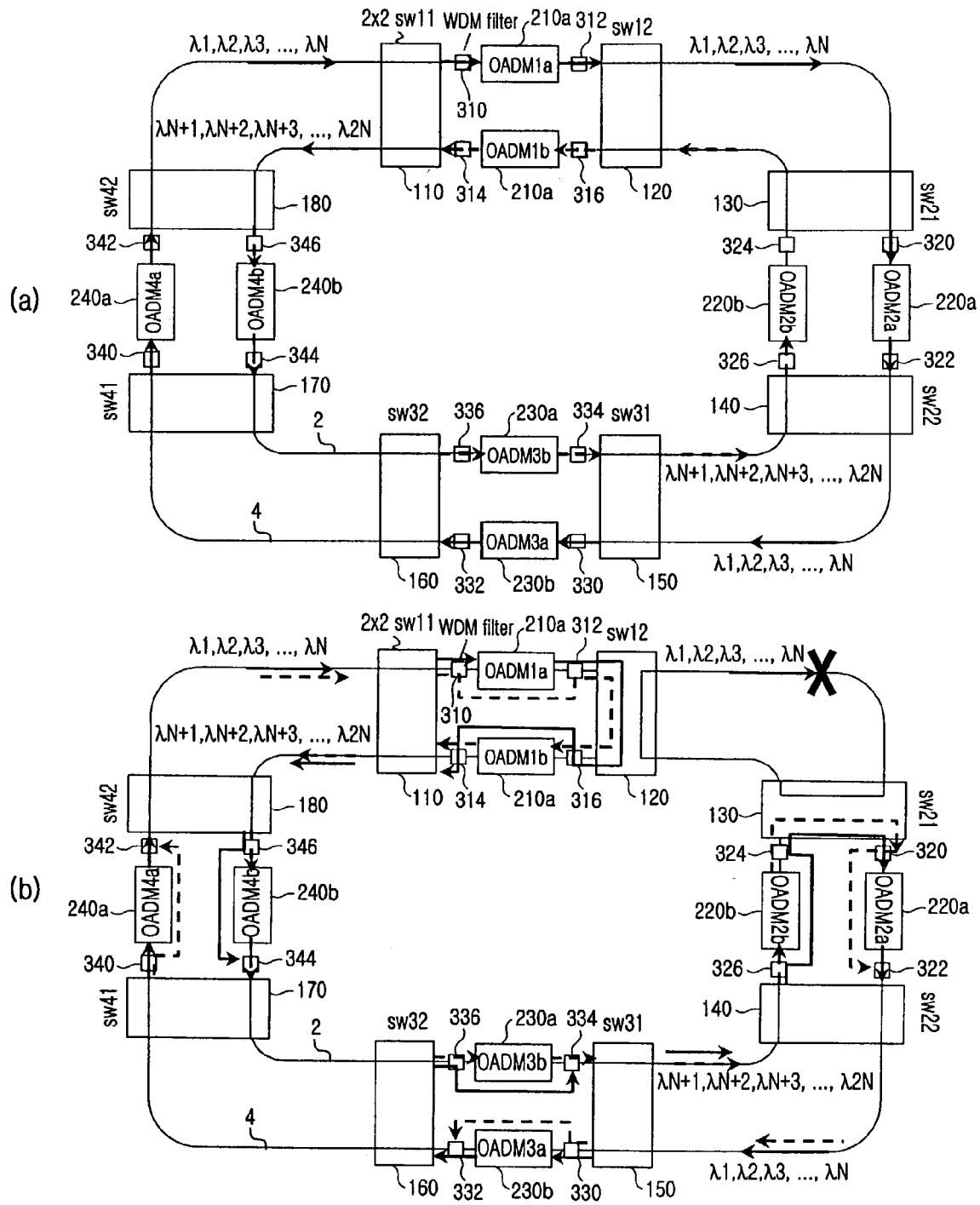
FIGS. 4A and 4B are views showing a ring network using an optical add/drop multiplexer and a 2×2 optical switching device according to the first embodiment of the present invention.

Nodes that are remote from the failure link allow the optical switching devices to be maintained in the bar state, which is similar to the normal operation. According to the back loop procedure described above, signals can be redirected to the correct destination node, via the number of WDM filters, with less dependence on the number of multiplexer and demultiplexer as in the prior art. As shown in FIG. 4, the looped-back optical signals are connected to each other via the WDM filters, thus allowing the capacity of the multiplexer and demultiplexer of the inventive optical add/drop multiplexer to 1×N.

Figure 5:
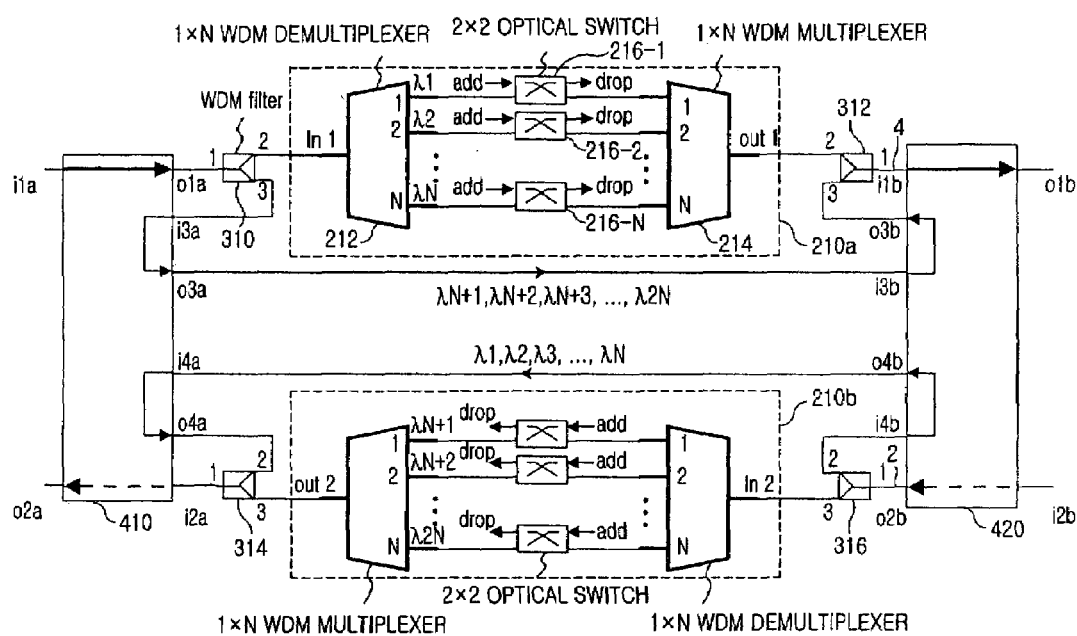
FIG. 5 is a view showing an optical add/drop multiplexer and a 4×4 optical switching device according to a second embodiment of the present invention.

FIG. 5 illustrates an optical add/drop multiplexer and a 4×4 optical switching device according to a second embodiment of the present invention. FIGS. 6A and 6B shows a bidirectional ring network using the optical add/drop multiplexer and the 4×4 optical switching device according to the second embodiment of the present invention shown in FIG. 5. More specifically, FIG. 6A represents the bidirectional ring network during a normal operation, and FIG. 6B represents the bidirectional ring network, in which an optical fiber transmission link failure connecting an optical add/drop multiplexer to another optical add/drop multiplexer occurs.

Figure 6:
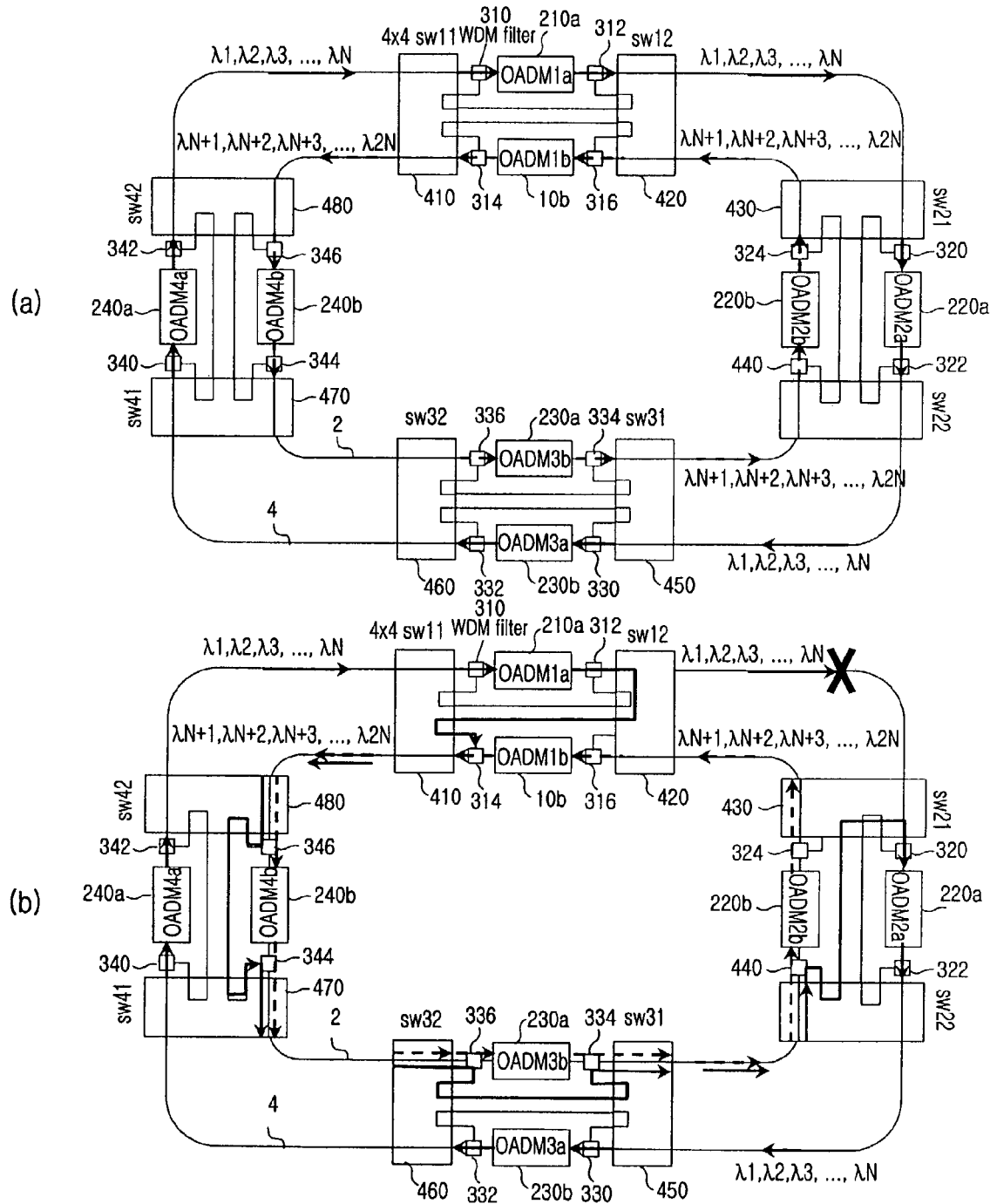
FIGS. 6A and 6B are views showing a bidirectional ring network using an optical add/drop multiplexer and a 4×4 optical switching device according to the second embodiment of the present invention; and, FIGS. 7A to 7C are views showing a node state of a bidirectional ring network for a protection switching according to a third embodiment of the present invention.

Referring to FIGS. 5 and 6A, optical add/drop multiplexers 210a and 210b and 4×4 optical switching devices 410 to 480 are connected to each other via WDM filters 310, 312, 314, and 316, and similar to the first embodiment. Unlike the first embodiment where the looped-back optical signals are multiplexed or demultiplexed via the optical add/drop multiplexers 210a to 240a and 210b to 240b, the 4×4 optical switching devices 410 to 480 according to the second embodiment enables to switch the looped-back signals independently. That is not only the optical signals passing through the link failure, but also the optical signals passing through a normal link without the failure are looped back together by means of the 2×2 optical switching devices 210 to 280. However, in the second embodiment of the present invention, optical signals passing though the link failure are looped-back only by means of the 4×4 optical switching devices 410 to 480. To this end, two input/output terminals are added to the 4×4 optical switching devices 410 to 480 so as to connect only the looped-back signals through the WDM filters when a link failure occurs. As shown in FIG. 5, a third input part $i_{3a}$ is connected to a third output part $o_{3a}$ and a fourth input part $i_{4a}$ is connected to a fourth output part $o_{4a}$. In short, the 4×4 optical switching devices 410 to 480 are provided with separate input/output terminals for looping back the optical signal having wavelength bands processed in one ring network and separate input/output terminals for transferring optical signals having wavelength bands processed in the other ring network when a link failure occurs in an optical fiber link of the ring networks, as explained in detail hereinafter Referring to FIG. 6, when a bidirectional ring network is operating normally without any link failure, optical signals with the wavelengths of $\lambda_1, \lambda_2, \lambda_3, \ldots \lambda_N$ applied to an input part $i_{1a}$ are transferred to an output part $o_{1a}$, and then transferred to a WDM filter 310 connected the output port $o_{1a}$. The WDM filter 310 demultiplexes the optical signals with the wavelengths of $\lambda_1, \lambda_2, \lambda_3, \ldots \lambda_N$ and received via the second port thereof. The optical signals with the wavelengths of $\lambda_1, \lambda_2, \lambda_3, \ldots \lambda_N$ and have passed through the WDM 310, are demultiplexed by the 1×N demultiplexer 212 of the optical add/drop multiplexer 210a, so that the optical signals can be added or dropped at this juncture. Then, the optical signals with the wavelengths of $\lambda_1, \lambda_2, \lambda_3, \ldots \lambda_N$ are multiplexed by the 1×N multiplexer 214 and outputted through a WDM filter 312. After that, the optical signals with the wavelengths of $\lambda_1, \lambda_2, \lambda_3, \ldots \lambda_N$ and outputted from the WDM filter 312 are transferred to an output part $o_{1b}$ via an input part $i_{1b}$ of the 4×4 optical switching device 420, and then transmitted to an adjacent node.

The WDM filter 316 demultiplexes the optical signals with the wavelengths of $\lambda_{N+1}, \lambda_{N+2}, \lambda_{N+3}, \ldots \lambda_{2N}$ using the third port thereof. The optical signals having wavelengths of $\lambda_{N+1}, \lambda_{N+2}, \lambda_{N+3}, \ldots \lambda_{2N}$, which have passed through the WDM 316, are demultiplexed through the 1×N demultiplexer of the optical add/drop multiplexer 210b, so that the optical signals are added or dropped at this juncture. Then, the optical signals having wavelengths of $\lambda_{N+1}, \lambda_{N+2}, \lambda_{N+3}, \ldots \lambda_{2N}$ are multiplexed through the 1×N multiplexer and outputted through a WDM filter 314. Thereafter, the optical signals having wavelengths of $\lambda_{N+1}, \lambda_{N+2}, \lambda_{N+3}, \ldots \lambda_{2N}$ passing through the WDM filter 314 are transferred to an output part $o_{2a}$ through an input part $i_{2a}$ of the 4×4 optical switching device 420, and then transmitted to an adjacent node.

On the other hand, if an optical fiber link failure occurs, for example, if the optical fiber link positioned between the optical switching device 420 and the optical switching device 430 of the outer ring network 4 experiences a link failure, the optical signals having wavelengths of $\lambda_1, \lambda_2, \lambda_3, \ldots \lambda_N$ inputted into the optical add/drop multiplexer 210a of the outer ring network 4 cannot be forwarded to the optical switching device 430 through the optical switching device 420. Since the optical signals having wavelengths of $\lambda_1, \lambda_2, \lambda_3, \ldots \lambda_N$ cannot be transmitted to the optical switching device 430, the optical signals having wavelengths of $\lambda_1, \lambda_2, \lambda_3, \ldots \lambda_N$ are transmitted in clockwise direction by looping back the optical signals, while changing a switch state of the 4×4 optical switching device 420. Since the optical add/drop multiplexers 240b and 230b are positioned remotely away from the link failure point, the switch state of the switching device thereof is maintained is the same. As such, the looped-back optical signals are connected through the WDM filters, and signals are transferred without performing multiplexing or demultiplexing process. Ultimately, as shown in FIG. 6B, the 4×4 optical switching device 430 positioned at the other end of the link allows the looped-back optical signals having wavelengths of $\lambda_1, \lambda_2, \lambda_3, \ldots \lambda_N$ to be transferred to the optical add/drop multiplexer 220a.

Figure 7A:
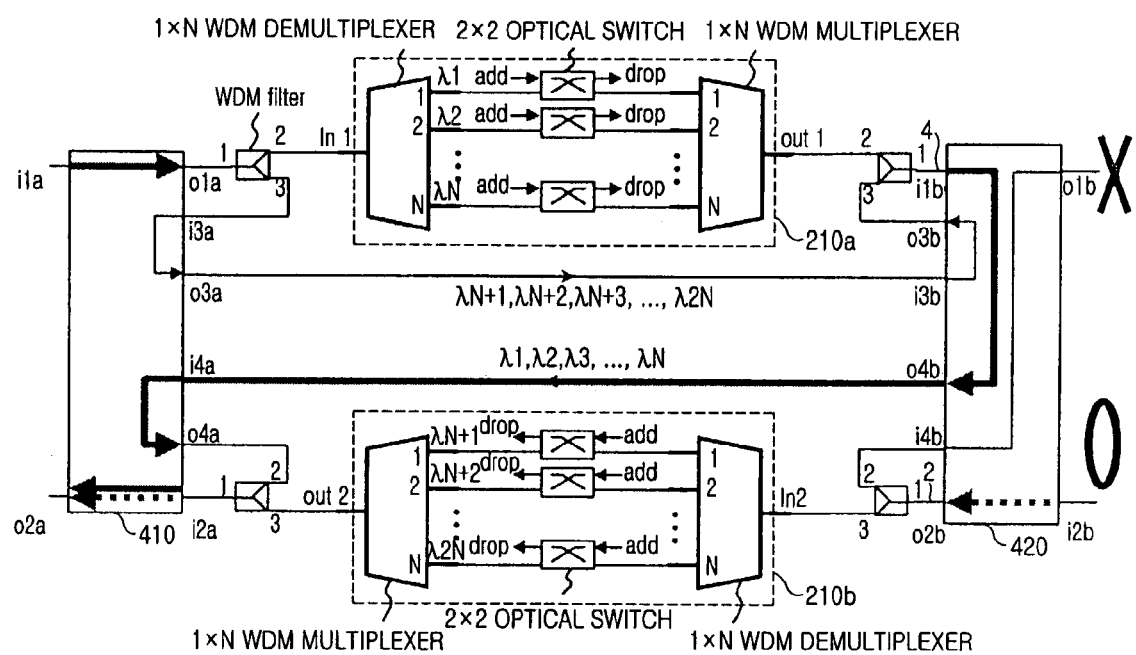
Figure 7B:
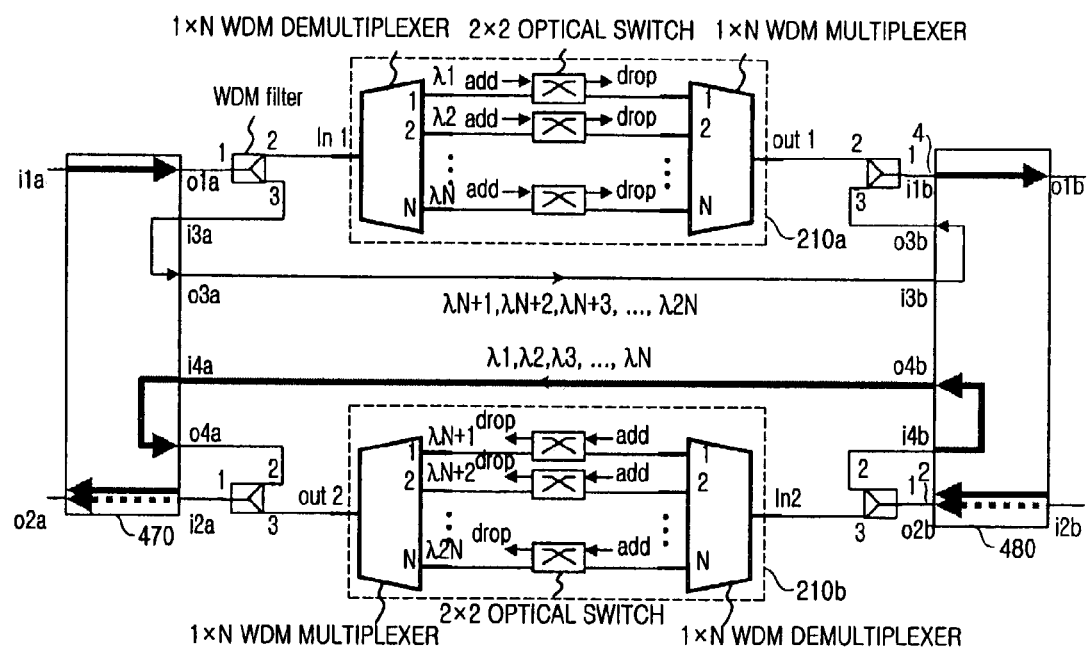
Figure 7C:
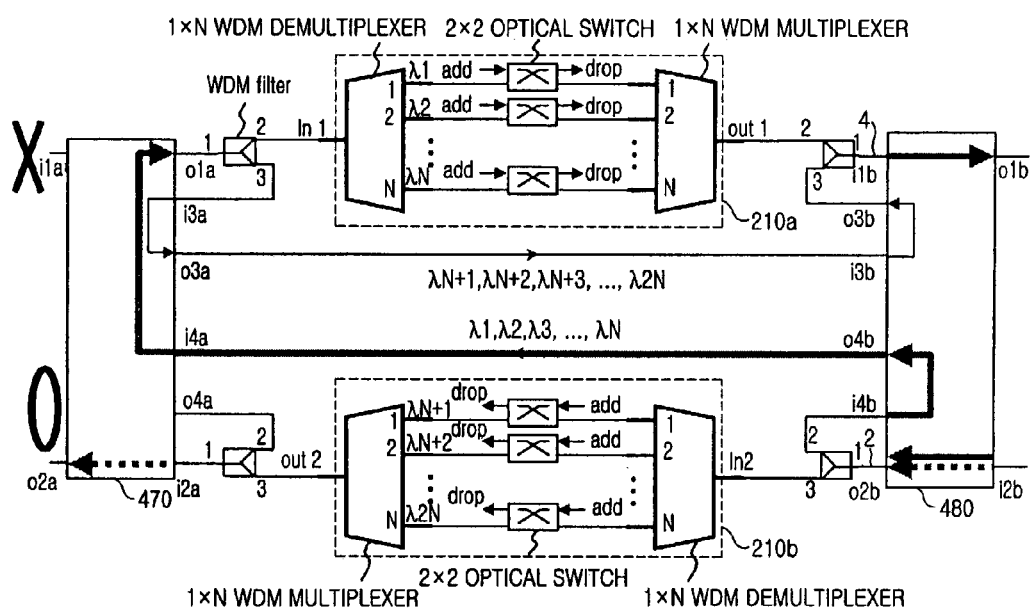

In order to facilitate the understanding of the present invention, FIGS. 7A to 7C are provided to illustrate the operation steps shown in FIG. 6 in the event there is a link failure. Accordingly, FIGS. 7A to 7C shows the node state of a bidirectional ring network for a recovery switching according to the second embodiment of the present invention.

FIG. 7A represents the node positioned at the left side of the link failure, in which the optical signals with the wavelengths of $\lambda_1, \lambda_2, \lambda_3, \ldots \lambda_N$ to be transmitted in a clockwise direction are unable to transmit due to the link failure. As a result, the optical signals are looped-back from an input part $i_{1b}$ to an output part $o_{4b}$ (shown as a solid line). As the lower link operates normally, the optical signals are transmitted in a counterclockwise direction without being looped-back (shown as a dotted line). The looped-back optical signals are multiplexed together with the optical signals transmitted in a counterclockwise direction through the WDM filters, so that the looped-back optical signals are transmitted to a counterclockwise adjacent node. Note that a slender solid line shown in FIG. 7A indicates that optical signals are not transferred.

FIG. 7B represents the node that is remote located away from the link failure, in which the looped-back optical signals and the optical signals, not affected by the link failure are transmitted to an adjacent node using the WDM filters.

FIG. 7C represents the node positioned at the right side of the link failure. The optical signals with the wavelengths of $\lambda_1, \lambda_2, \lambda_3, \ldots \lambda_N$, which are looped-back in a counterclockwise direction, have to be transmitted clockwise, so the direction of the optical signals is switched to an initial state thereof using the optical switching device. At this time, the input part $i_{4a}$ is connected to the output part $o_{1a}$ (shown as a solid line). The optical signals, which are not affected by the link failure, are transmitted without being looped-back (shown as a dotted line).

As described above, according to the bidirectional self-healing ring network of the present invention, optical signals passing through a normal link is transmitted without being looped-back with the aid of WDM filters, regardless the occurrences of a link failure during recovery operation. In addition, the capacity of the multiplexer and demultiplexer is reduced as much as a half when compared with the required capacity according to a conventional optical add/drop multiplexer. Thus, the ring network according to the teachings of the present invention can be established at a low cost and further assist in better management of link failures.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. In a bidirectional WDM ring network including an inner ring and an outer ring for processing N units of optical signals having a first wavelength band and a second wavelength band, a node comprising:
   a plurality of optical add/drop multiplexers along the inner and outer rings;
   a pair of switching devices interfacing the inner and outer rings and disposed between the optical add/drop multiplexers for switching a direction of the optical signals passing through the inner and outer rings; and,
   a plurality of WDM filters provided along the inner and outer rings and between the optical add/drop multiplexers and the switching devices, each WDM filter including a first port for permitting all wavelength bands to pass therethrough and coupled to the switching devices, a second port for permitting only optical signals processed by one of the inner and outer rings to pass therethrough and coupled to one end of the optical add/drop multiplexer, and a third port for permitting optical signals processed through the other of the inner and outer rings to pass therethrough and coupled to the other end of the optical add/drop multiplexer, wherein, upon a detection of a link failure in one of the inner and outer rings, the WDM ring network is operative to transfer optical signals to one of the inner and outer rings in a reverse direction via the switch device.

2. The WDM ring network of claim 1, wherein, upon a detection of a link failure, the switch device coupled to an optical link with the link failure transfers optical signals to one of the inner and outer rings without the link failure.

3. The bidirectional WDM ring network of claim 1, wherein the switching devices is a 2×2 optical switch.

4. The bidirectional WDM ring network of claim 3, wherein, upon a detection of a link failure, the ring network is operative to transfer optical signals with the first and second wavelength bands to one of the inner and outer rings in a reverse direction.

5. The bidirectional WDM ring network of claim 1, wherein the inner and outer rings is a bypass circuit using a loop-back operation when one of the inner and outer rings fails.

6. The bidirectional WDM ring network of claim 1, wherein the outer rings transmits optical signals in a clockwise direction and the inner rings transmits the optical signals in a counterclockwise direction.

7. The bidirectional WDM ring network of claim 1, wherein the switched optical signals are multiplexed and demultiplexed by the optical add/drop multiplexer.

8. The bidirectional WDM ring network of claim 1, wherein the plurality of optical add/drop multiplexers comprises a multiplexer and a demultiplexer for processing optical signals received therein.

9. The bidirectional WDM ring network of claim 1, wherein the switching devices is a 4×4 optical switch.

10. The bidirectional WDM ring network of claim 9, wherein the ring network is operative to transfer optical signals traveling on an optical line having the link failure to one of the inner and outer rings in a reverse direction.

* * * * *